United States Patent [19]

Oshima et al.

[11] Patent Number: 5,250,630
[45] Date of Patent: Oct. 5, 1993

[54] PNEUMATIC TIRE

[75] Inventors: Nobumitsu Oshima, Kodaira; Takashi Kitamura, Musashimurayama; Ryota Fujio, Akigawa; Kenji Matsuo, Kodaira, all of Japan

[73] Assignee: Bridgestone Corporation, Tokyo, Japan

[21] Appl. No.: 691,879

[22] Filed: Apr. 26, 1991

[30] Foreign Application Priority Data

Apr. 27, 1990 [JP] Japan ................. 2-110652

[51] Int. Cl.$^5$ .................... C08F 265/02; C08F 267/02
[52] U.S. Cl. .................... 125/301; 525/383; 524/432; 524/526; 524/571; 524/573; 524/575
[58] Field of Search ............ 525/301, 383; 524/432, 524/526, 571, 573, 575

[56] References Cited

U.S. PATENT DOCUMENTS 4,513,110 4/1985 Radar .................. 524/432

Primary Examiner—John Kight, III
Assistant Examiner—Duc Truong
Attorney, Agent, or Firm—Sughrue, Mion, Zinn, Macpeak & Seas

[57] ABSTRACT

A heat resistant pneumatic tire whose tread is composed of a rubber composition comprising, as a main rubber component, a modified, conjugated diene based polymer prepared by adding an $\alpha, \beta$-unsaturated carboxylic acid represented by the following general formula:

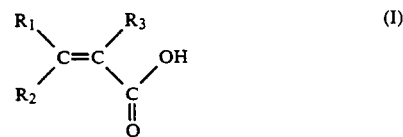

wherein $R_1$, $R_2$ and $R_3$ independently represent hydrogen atom, halogen atom, or an alkyl, alkenyl or allyl group having at most 5 carbon atoms, or a substituted alkyl, alkenyl or allyl group, to a conjugated diene based polymer in an amount within the range between 0.1% and 5.0% based on the weight of the conjugated diene based polymer. This tire is suitable for continuous running at high temperatures and maintains a good road-surface-grip performance even during such running.

5 Claims, 1 Drawing Sheet

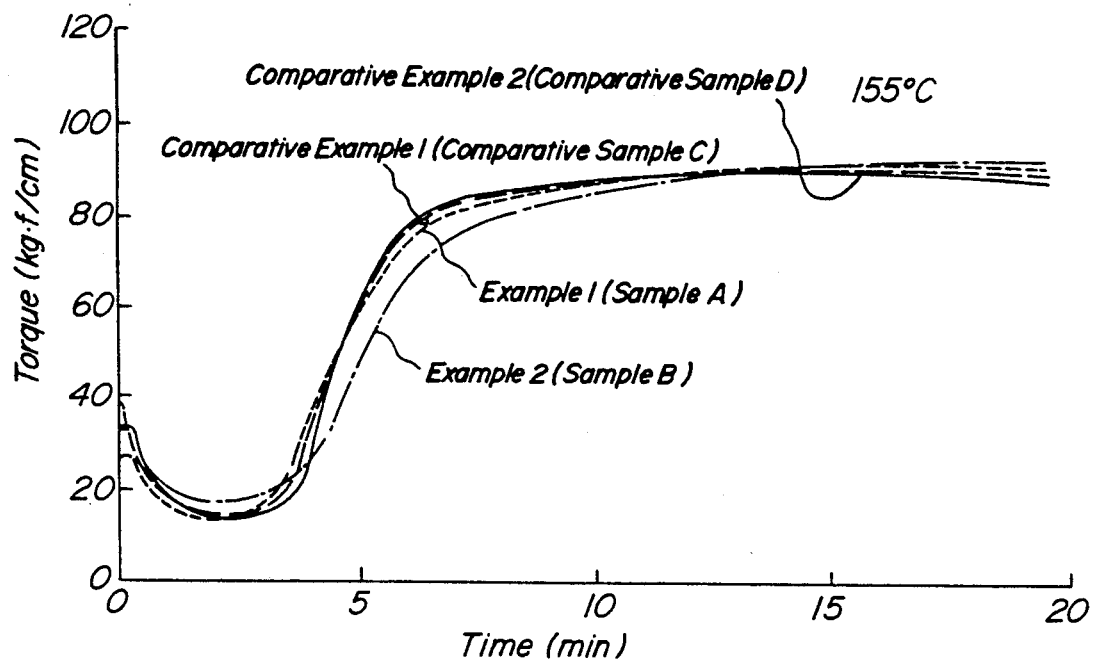
FIG_1
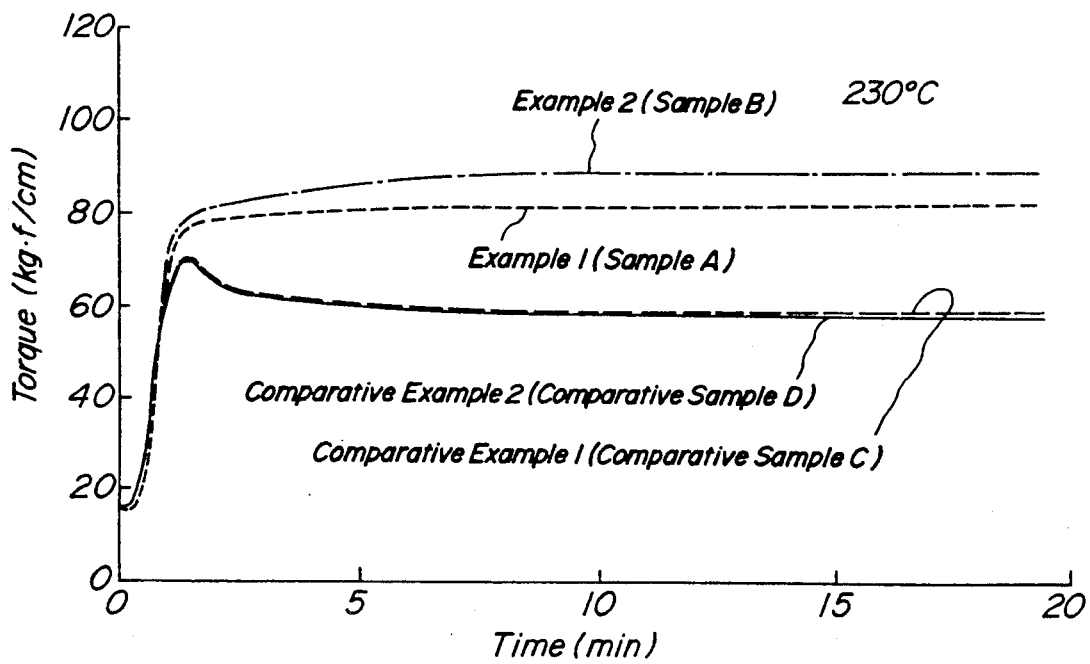
FIG_2

PNEUMATIC TIRE

BACKGROUND OF THE INVENTION

1. Field of the Invention

This invention relates to pneumatic tires, particularly, high-speed performance pneumatic tires applicable to continuous use under high temperature conditions, which have a rubber composition excellent in heat resistance arranged in the tread thereof.

2. Related Art Statement

As a result of a rise, to a great extent, of the working temperature of tires due to a recent increase in the speed of automobiles, a further improvement in durability of tires has been earnestly desired, aiming at prevention of heat deterioration of the physical properties of rubber due to high temperatures.

Previously, as a process for preventing heat deterioration, a rubber composition low in heat build-up has been used which barely allows the temperature of the tire to rise. However, such a process is naturally limited insofar since rubber is a viscoelastic body. Alternatively, as another technique, there has been proposed a process to increase monosulfide bonds having a relatively high resistance to heat, in crosslinkages, or the like. However, its effect has not been sufficient.

In addition, providing starting materials of a high molecular weight substance with desired characteristics by chemically modifying the high molecular weight substance itself has been actively conducted as an industrially effective measure. For example, Japanese Patent Application Laid-open No. 52-71,590, describes that a rubber of a conjugated diene based polymer is modified by adding a polymerizable unsaturated monomer to unsaturated bonds thereof and the resulting modified rubber is then utilized as an adhesive, coating or photosensitive agent by subjecting it to a curing reaction by means of a free-radical initiator, ultraviolet rays or the like. However, no description is made of availability of such a modified rubber as a material for tires, particularly, a heat resistant material for tires.

Furthermore, Japanese Patent Application Laid-open No. 58-13,677 describes an anaerobic adhesive composition comprising a polymer having a methacryloyloxy group or acryloyloxy group on the side chain thereof and a polymerizable organic acid. However, similar to the method described above, no description is made of utilizing the composition as a heat resistant material for tires.

SUMMARY OF THE INVENTION

An object of this invention is to provide tires with an improved resistance to heat which is realized by utilizing a modified polymer having more improved heat resistant crosslinkages.

The heat deterioration is accounted for as being brought about by breakage of polysulfide linkages, whereby free radicals are formed. The inventors believe that polymers having crosslinkages newly formed by positively taking up the thus formed free radicals or polymers having a structure crosslinked by a thermally stable C-C bond or C-N bond would have a high heat-stability. Then, as a result of an assiduous study, the inventors have found that an improved, heat resistant pneumatic tire can be obtained by using, for the tread, a rubber composition comprising, as a main rubber component, a polymer modified by adding an $\alpha$, $\beta$-unsaturated carboxylic acid to a conjugated diene based polymer, and achieved this invention.

Namely, this invention is a pneumatic tire wherein a rubber composition comprising, as a main rubber component, at least one of modified, conjugated diene based polymers prepared by adding an $\alpha$, $\beta$-unsaturated carboxylic acid represented by the following general formula:

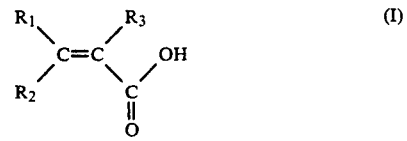

wherein $R_1$, $R_2$ and $R_3$ independently represent hydrogen atom, halogen atom, or an alkyl, alkenyl or allyl group having at most 5 carbon atoms, or a substituted alkyl, alkenyl or allyl group, to a conjugated diene based polymer in an amount within the range between 0.1% and 5.0% by weight, is arranged in the tread of the tire.

BRIEF DESCRIPTION OF THE DRAWING

The above and other objects, features and advantages of the present invention will become more apparent from reading the following description of the preferred embodiments taken in connection with the accompanying drawings, wherein:

FIG. 1 is a graph showing vulcanization curves at 150° C. of rubber compositions according to this invention and Comparative Example, respectively; and FIG. 2 is a graph showing vulcanization curves at 230° C. of the same rubber compositions as shown in FIG. 1.

DETAILED DESCRIPTION OF THE INVENTION

As a conjugated diene based polymer that is the parent body forming the above-described modified, conjugated diene based polymers, mention may be made of any polymers having a double bond originated from a conjugated diene monomer. However, it is preferred to select from polybutadiene, polyisoprene, styrene-butadiene copolymers, styrene-isoprene copolymers, isoprene-butadiene copolymers, styrene-isoprene-butadiene terpolymers, ethylene-propylene-diene terpolymers and butadiene-methacrylic acid copolymers. The weight-average molecular weight ($M_W$) and its distribution of these polymers are not specifically limited and appropriately selected according to scope of application. However, it is generally preferred to use those having a molecular weight ($M_W$) of at least about 100,000.

As an $\alpha$, $\beta$- unsaturated carboxylic acid to be added for modification, mention may be made of, for example, acrylic acid, methacrylic acid, crotonic acid, tiglic acid, sorbic acid, cinnamic acid, maleic acid monobutyl ester, or the like The modified, conjugated diene based polymers to be employed in this invention can be manufactured by a process as follows:

Namely, they can be preferably manufactured by reacting an organic halogenating agent selected from alkyl hypohalites such as tertiary butyl hypochlorite, tertiary butyl hypobromite or tertiary amyl hypochlorite, and N-haloamide compounds such as N,N- dichlorobenzene sulfonamide, N,N-dichloromethyl urethane, N,N-dichloroacetamide, N,N-dichlorotoluene sulfonamide, N,N-dichlorosuccinate imide or N,N-dibromosuccinate imide, or trihaloisocyanuric acids such as trihaloisocyanuric acid, or the like and an $\alpha$, $\beta$-unsaturated carboxylic acid as represented by the general formula (I), with the above-described conjugated diene based polymer in an organic solvent.

Exemplifying acrylic acid as the $\alpha$, $\beta$-unsaturated carboxylic acid, tertiary butyl hypochlorite as the organic halogenating agent and 1,4-polybutadiene as the conjugated diene based polymer, the modification reaction thereof is shown below.

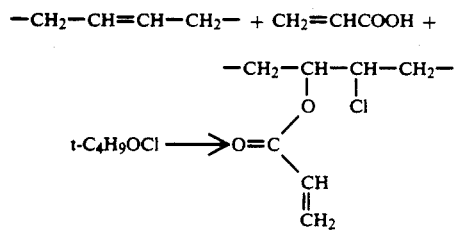

The addition of an $\alpha$, $\beta$-unsaturated carboxylic acid to a conjugated diene based polymer in this invention is conducted generally in the presence of a solvent. However, the addition reaction may also be conducted in a solid state using a rubber milling machine such as a roll, Banbury, kneader or the like mixer. Alternatively, it is industrially advantageous to conduct the addition reaction using a reaction liquid as left after the polymerization reaction to produce a conjugated diene based polymer has been completed. As a solvent to be employed, mention may be made of at least one solvent selected from aromatic solvents such as benzene, toluene, xylene or the like, paraffinic solvents such as hexane, heptane or the like, and halogenated hydrocarbonic solvents such as chloroform or the like. Further, generally speaking, preferred are solvents capable of dissolving both the conjugated diene based polymers to be modified and the $\alpha$, $\beta$-unsaturated carboxylic acids and inert to the addition reaction.

The content of the $\alpha$, $\beta$-unsaturated carboxyl group in the modified, conjugated diene based polymer to be used in this invention is required to be 0.1-5.0%, preferably 0.3-3.0%, by weight. If the above content of the $\alpha$, $\beta$-unsaturated carboxyl group is less than 0.1% by weight, a sufficient heat-stability cannot be obtained, while if it exceeds 5.0% by weight, a problem of scorch or burning during a processing step will arise.

The modified, conjugated diene based polymer occupies at least 30%, preferably at least 50%, by weight, of all the rubber components in the rubber composition employed according to this invention, in order to enjoy heat-resistivity. As an elastomer other than the modified, conjugated diene based polymers, advantageously employed are styrene-butadiene copolymers, polybutadiene, natural rubbers, polyisoprene (IR) and the like.

The reinforcement to be incorporated into the rubber composition in this invention is not specifically limited to a certain kind. However, preferably employed are carbon blacks having an average particle diameter of 10–500 nm, for example, furnace blacks such as IISAF, ISAF, SAF, HAF, FEF, GPF or the like; thermal blacks such as FT, MT or the like; or acetylene blacks; or the like, as well as silica based reinforcements having an average particle diameter of 10–100 nm, such as silicic anhydride according to a dry process, silicic acid hydrate according to a wet process, or the like.

Alternatively, as a filler, calcium carbonate, clay, talc and the like are adequately employed.

When the reinforcements and fillers are incorporated, the loads are selected to be generally within the range of 1–250 parts, preferably 30–200 parts, per 100 parts by weight of the rubber components, according to use.

Further, as a vulcanizer, most generally sulfur is used and incorporated in an amount of 0.3–5.0 parts, preferably 0.5–3.0 parts, per 100 parts by weight of all the rubber components. If the load of sulfur in the modified, conjugated polymer is outside the above range, the vulcanized body will not have good properties as a tread material. Furthermore, as another vulcanizer, sulfur doners such as thiuram type, thiazol type or the like, and peroxides, urethane vulcanizers, resin vulcanizers and the like, may be employed, if required. Additionally, crosslinking by a multivalent amine can also be performed, utilizing the Michael addition reaction of an $\alpha$, $\beta$-unsaturated carboxyl group with an amine. As the multivalent amine, mention may be made of aliphatic or alicyclic, primary or secondary diamines, such as hexamethylene diamine, heptamethylene diamine, methylene-bis(cyclohexylamine), 1,3-di-4-piperidyl propane, 4,4'-dipiperidyl or the like; aromatic primary diamines, such as 4,4-methylene dianiline or the like; aromatic secondary diamines, such as N,N'-diphenyl-p-phenylene diamine (DPPD), p-octyldiphenyl amine, p,p'-dioctyldiphenyl amine, di-$\beta$-napthylphenylene diamine or the like; and tri- or more valent amine compounds, such as diethylene triamine, triethylene tetramine, tetraethylene pentamine or the like. Among the above, N,N'-diphenyl-p-phenylene diamine is preferred. The amine is incorporated in an amount of 0–10 parts, preferably 0–3 parts, per 100 parts by weight of the rubber components. If the amine is in excess of 10 parts by weight, a problem of scorch or change with time of green rubbers will arise.

Further, there are exemplified as a vulcanization accelerator, a sulfenamide type, thiuram type, thiazol type, guanidine type, mercapto-triazine type, aldehyde-amine type, or the like; as an accelerator activator, carboxylic acids such as stearic acid, oleic acid or the like and metallic compounds such as zinc stearate, zinc oxide, magnesium oxide, calcium hydroxide, lead carbonate or the like; as a softening agent, process oils such as paraffinic, naphthenic, aromatic or the like, as a tackifier, a rosin type, petroleum hydrocarbon resin type, coumarone resin type, phenol.terpene resin type or the like; and as an antioxidant, an amine type, phenol type or the like, respectively. Additionally, the above vulcanization accelerators and accelerator activators are used mainly in the case of vulcanization with sulfur or a sulfur doner.

The process for incorporating the above agents is not specifically limited and generally various rubber milling machines can be employed therefor. However, particularly the carbon blacks and various process oils can be incorporated into the rubber at the step of preparing a starting material rubber or the step of modifying the rubber, to provide a carbon master batch and oil master batch, respectively.

In the case where the rubber composition according to the present invention is arranged in the tread, it can be suitably used in the ground-contact portion or base portion or both, of the tread. When it is used in the contact portion of the tread, the rubber composition can provide tires with good grip characteristics even at high temperatures, and when used in the tread base portion, it can provide a good endurability to the tires. The tire according to this invention is not specifically limited. However, making the best use of high heat-stability of the rubber composition, racing tires used continuously under a high temperature condition or passenger car tires to run at a high speed are preferred. Further, the rubber composition employed for the tires according to the present invention also can be suitably employed not only as a tread rubber for large-load-bearing pneumatic tires or constructional vehicle tires, but also as a side rubber, etc., which require resistance to heat.

This invention will be explained hereinafter in more detail by way of example.

The test results of various rubber compositions and tires described herein were obtained by the following testing methods:

(1) Tensile strength

A dumbbell No. 3 shaped test-piece defined in JIS K 6301 was stamped out and tested for tensile strength with a stretching rate of 300 mm/min. at 25° C.

(2) Lambourn abrasion test

An abrasion resistance test was conducted with the Lambourn abrasion tester at slip conditions of 25% and 60%, respectively. The obtained values were represented by an index, assuming the value obtained in Comparative Example 2 being 100. The larger the value, the better the abrasion resistance.

(3) Lap time measurement

Tires differing in rubber composition of the tread rubber thereof were manufactured for trial. Mounting these tires, a cart running test was conducted. A lap time on the tenth lap of a car course (720 m) was adopted. The smaller this value, the better the road-surface-grip characteristics.

Manufacturing Example of a modified styrene-butadiene copolymer rubber

A solution of 2.1 g t-BuOCl in 20 ml cyclohexane was dropped into a mixed solution comprising a 100 g styrene-butadiene copolymer rubber (the trade name: Tuffden-2000R) dissolved in 1,000 ml cyclohexane and 1 g acrylic acid admixed therewith, over 5 minutes while stirring at a temperature of 70° C., and reaction was carried out for further 3 hours. Then, the reaction mixture was poured into 1.5 l of methanol dissolving therein a 5 g antioxidant [2,6-di-t-butyl-4-methyl phenol (BHT)] to coagulate a modified copolymer rubber. Further, the resulting coagulation was pulverized, washed well with a methanol solution containing fresh BHT and then dried for a whole day and night with a vacuum dryer to provide Sample A. An analysis of the sample for confirming effect of the modification reaction was conducted using an infrared spectrophotometer (IR: NIPPON BUNKO KOGYO, A-III) and Gel Permeation Chromatography (GPC: manufactured by Tosoh Corporation, HLC 8020, Column GMHXL 2), and the results shown in Table 1 were obtained. The amount of the added $\alpha$, $\beta$-unsaturated carboxylic acid was calculated from a calibration curve of the corresponding carboxylic acid ester, making use of the absorption intensity of carbonyl in IR. The determination of weight-average molecular weight ($M_w$) and $M_w/M_n$ was conducted with GPC (reduced to polystyrene).

As is seen in Table 1, the molecular weight did not change with the modification and it was found from the absorption intensity of carbonyl that acrylic acid was introduced into the copolymer rubber.

TABLE 1

| Sample | $M_w$ | ($M_w/M_n$) | Amount of addition (wt. %) |
|---|---|---|---|
| Sample A | 181,000 | (2.2) | 0.38 |
| Sample B | 180,000 | (2.2) | 0.74 |
| Comparative Sample C | 181,000 | (2.1) | 0.34 |
| Comparative Sample D (Tofden 2000R) | 183,000 | (2.1) | 0.00 |

Sample B was obtained in exactly the same manner as Sample A, except that methacrylic acid was used in lieu of acrylic acid. The analysis was conducted in the same manner as Sample A and the results shown in Table 1 were obtained. As is seen in Table 1, the weight-average molecular weight ($M_w$) did not change with the modification and it was found from the absorption intensity of carbonyl that methacrylic acid was introduced into the elastomer.

Alternatively, as Comparative Example, Comparative Sample C was obtained in exactly the same manner as Sample A except that propionic acid was used in lieu of acrylic acid. As is seen in Table 1, the weight-avrage molecular weight ($M_w$) did not change with the modification and it was found from the absorption intensity of carbonyl that propionic acid was introduced into the copolymer rubber.

Further, using Tofden 2000R as Comparative Sample D, the analysis was conducted in the same manner as Sample A and the results shown in Table 1 were obtained.

Examples 1 and 2, and Comparative Examples 1 and 2

In accordance with the formulation shown in Table 2, Sample A or B, or Comparative Sample C or D was kneaded and each unvulcanized rubber composition was obtained. Each rubber composition was measured for vulcanization characteristics under temperature conditions of 155° C. or 230° C. with a rheometer. The results are shown in FIG. 1, and the physical properties of the vulcanized bodies are shown in Table 3.

TABLE 2

| Component (part by weight) | Example 1 | Example 2 | Comparative Example 1 | Comparative Example 2 |
|---|---|---|---|---|
| Rubber component: | | | | |
| Sample A | 100 | | | |
| Sample B | | 100 | | |
| Comparative Sample C | | | 100 | |
| Comparative Sample D (Tofden 2000R) | | | | 100 |
| Aroma oil | 10 | 10 | 10 | 10 |
| Carbon black | 50 | 50 | 50 | 50 |
| Stearic acid | 2 | 2 | 2 | 2 |
| Zinc white | 3 | 3 | 3 | 3 |
| Antioxidant 6C | 1 | 1 | 1 | 1 |
| Accelerator DM | 1 | 1 | 1 | 1 |
| DPG | 0.5 | 0.5 | 0.5 | 0.5 |
| Sulfur | 1.5 | 1.5 | 1.5 | 1.5 |

(Note)
6C: N-(1,3-dimethyl-butyl)-N'-phenyl-p-phenylene diamine.
DM: 2,2'-dithio-bis-benzothiazole.
DPG: 1,3-diphenyl guanidine.

TABLE 3

| Vulcanization characteristics | Example 1 | Example 2 | Comparative Example 1 | Comparative Example 2 |
| --- | --- | --- | --- | --- |
| Tensile property: | | | | |
| Room temperature: | | | | |
| Tb (kgf/cm$^2$) | 204 | 203 | 195 | 203 |
| Eb (%) | 450 | 455 | 445 | 470 |
| 100° C.: | | | | |
| Tb (kgf/cm$^2$) | 104 | 101 | 92 | 86 |
| Eb (%) | 292 | 280 | 274 | 276 |
| Lambourn abrasion index: | | | | |
| (25% slip) | 100 | 101 | 98 | 100 |
| (60% slip) | 102 | 101 | 100 | 100 |

As is seen from FIGS. 1 and 2, it was found that at 15° C. (FIG. 1), Sample A, B and Comparative Sample C, all using a modified copolymer rubber, showed substantially the same vulcanization curves as the unmodified Comparative Sample D, while at 230° C. (FIG. 2), Comparative Samples C and D showed reversion, whereas Samples A and B using the modified copolymer rubber according to this invention showed no reversion and had a high heat-stability. Further, as seen from Table 3, the tensile characteristics at room temperature substantially did not change and the tensile strength under a high temperature condition increased. The abrasion resistance index also did not change substantially. The rubber composition of this invention was noticeably improved in heat-resistivity.

Examples 3 and 4, and Comparative Examples 3 and 4

Using Samples A and B and Comparative Samples C and D, 4 kinds of cart tires, Tires No. 1-4, were manufactured for trial in accordance with the formulations shown in Table 4. These tires were evaluated with respect of road-surface-grip characteristics. The results are shown in Table 4.

TABLE 4

| | Example 3 | Example 4 | Comparative Example 3 | Comparative Example 4 |
| --- | --- | --- | --- | --- |
| | Unit: part by weight | | | |
| Tire No. | 1 | 2 | 3 | 4 |
| Sample A | 100 | — | — | — |
| Sample B | — | 100 | — | — |
| Comparative Sample C | — | — | 100 | — |
| Comparative Sample D (Tofden 2000R) | — | — | — | 100 |
| Aroma oil | 100 | 100 | 100 | 100 |
| HAF Carbon | 100 | 100 | 100 | 100 |
| Stearic acid | 2 | 2 | 2 | 2 |
| Antioxidant 6C[1] | 1 | 1 | 1 | 1 |
| Zinc white | 3 | 3 | 3 | 3 |
| Accelerator DM[2] | 1.2 | 1.2 | 1.2 | 1.2 |
| DPG[3] | 0.6 | 0.6 | 0.6 | 0.6 |
| Sulfur | 1.5 | 1.5 | 1.5 | 1.5 |

TABLE 4-continued

| | Example 3 | Example 4 | Comparative Example 3 | Comparative Example 4 |
| --- | --- | --- | --- | --- |
| | Unit: part by weight | | | |
| Lap time (sec.) | 34.06 | 34.12 | 34.41 | 34.49 |

(Note)
[1]N-(1,3-dimethyl-butyl)-N'-phenyl-p-phenylene diamine.
[2]2,2'-dithio-bis-benzothiazole.
[3]1,3-diphenyl guanidine.

As apparent from Table 4, by using a rubber composition having heat resistance improved as the above in the tread of a pneumatic tire, the rubber does not fatigue and the grip performance is not lowered, so that a good lap time can be recorded.

As is clear from Examples and Comparative Examples, the pneumatic tires of the present invention have improved heat resistance characteristics wherein a rubber composition having improved heat resistance characteristics, comprising, as a main rubber component, a conjugated diene based polymer modified by adding an α, β-unsaturated carboxylic acid thereto, is arranged in the tread. Thus, the tires of this invention are suitable for continuous running at high temperatures and maintain a good road-surface-grip performance even during such running.

What is claimed is:

1. A pneumatic tire comprising, in the tread of the tire, a rubber composition comprising, as a main rubber component, at least one modified, conjugated diene based polymer prepared by reacting an organic halogenating agent and an α, β-unsaturated carboxylic acid represented by the following formula:

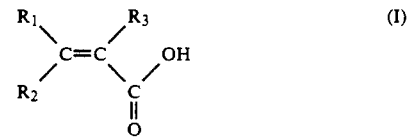

wherein $R_1$, $R_2$ and $R_3$ independently represent a hydrogen atom, a halogen atom, or an alkyl, alkenyl or allyl group having at most 5 carbon atoms, or a substituted alkyl, alkenyl or allyl group,
with a conjugated diene based polymer in an organic solvent, wherein the content of the α,β-unsaturated carboxylic acid is within the range between 0.1% and 5.0% based on the weight of the conjugated diene based polymer.

2. The pneumatic tire according to claim 1, wherein said rubber composition is incorporated with sulfur in an amount of 0.3-5.0 parts per 100 parts by weight of all rubber components in said rubber composition, according to a content of said at least one modified, conjugated diene based polymer in the rubber components.

3. The pneumatic tire according to claim 1, wherein said at least one modified, conjugated diene based polymer is at least one polymer selected from the group consisting of polybutadiene, polyisoprene, styrene-butadiene copolymers, styrene-isoprene copolymers, isoprene-butadiene copolymers, styrene-isoprene-butadiene terpolymers, ethylene-propylene-diene terpolymers and butadiene-methacrylic acid copolymers.

4. The pneumatic tire according to claim 1, wherein said organic halogenating agent is selected from the group consisting of alkyl hypohalites, N-haloamide compounds and trihaloisocyanuric acids.

5. The pneumatic tire according to claim 1, wherein said organic solvent is at least one solvent selected from the group consisting of organic solvents, paraffinic solvents and halogenated hydrocarbonic solvents.

* * * * *